US010412559B2

(12) United States Patent
Bhanot et al.

(10) Patent No.: US 10,412,559 B2
(45) Date of Patent: *Sep. 10, 2019

(54) TRACKING BUILDING LOCATIONS OF FIXED WIRELESS DEVICES

(71) Applicant: T-Mobile USA, Inc., Bellevue, WA (US)

(72) Inventors: Shilpa Bhanot, Sammamish, WA (US); Justin Mueller, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,090

(22) Filed: Feb. 25, 2019

(65) Prior Publication Data

US 2019/0191283 A1    Jun. 20, 2019

Related U.S. Application Data

(63) Continuation of application No. 16/116,848, filed on Aug. 29, 2018, which is a continuation of application
(Continued)

(51) Int. Cl.
| | |
|---|---|
| *H04W 4/33* | (2018.01) |
| *H04L 29/12* | (2006.01) |
| *H04W 4/02* | (2018.01) |
| *H04B 17/26* | (2015.01) |
| *H04B 17/318* | (2015.01) |

(Continued)

(52) U.S. Cl.
CPC ............ *H04W 4/33* (2018.02); *H04B 17/26* (2015.01); *H04B 17/27* (2015.01); *H04B 17/318* (2015.01); *H04L 61/6022* (2013.01); *H04W 4/026* (2013.01); *H04B 17/24* (2015.01); *H04L 61/609* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0008337 A1* | 1/2010 | Bajko | ................... H04W 4/043 370/338 |
| 2011/0173146 A1 | 7/2011 | Hnatio | |

(Continued)

*Primary Examiner* — Idowu O Osifade
(74) *Attorney, Agent, or Firm* — Perkins Coie LLP

(57) ABSTRACT

A system for generating a database containing the internal locations (e.g., floor, compass direction, room number, nearest fixed landmark, etc.) of fixed wireless devices within a building. To collect data for the database, a report-provider traverses a building with a mobile reporting device. As the provider traverses the building, the mobile reporting device directs the reports-provider to detected wireless devices (e.g., WiFi access points, Bluetooth beacons, Internet-connected appliances, etc.) and instructs the provider to enter information regarding the internal location of each device. When a walk-thru of a building is complete, the mobile reporting device generates a building report that contains the building's location and the internal locations of the detected wireless device. Multiple such reports may be combined by the system to generate the database of internal locations of wireless devices in various buildings.

20 Claims, 8 Drawing Sheets

Related U.S. Application Data

No. 15/286,456, filed on Oct. 5, 2016, now Pat. No. 10,070,268.

(60) Provisional application No. 62/237,512, filed on Oct. 5, 2015.

(51) Int. Cl.
*H04B 17/27* (2015.01)
*H04B 17/24* (2015.01)
*H04W 84/12* (2009.01)

(56) References Cited

U.S. PATENT DOCUMENTS

| | | | |
|---|---|---|---|
| 2014/0266909 A1* | 9/2014 | Palanki | G01S 5/0278 342/451 |
| 2014/0274136 A1* | 9/2014 | Edge | H04W 4/04 455/456.2 |
| 2017/0118213 A1 | 4/2017 | Edge et al. | |
| 2018/0376303 A1 | 12/2018 | Bhanot et al. | |

* cited by examiner

| MAC Addr | Building Addr | Building Floor | Floor Location | Primary Nearby Demographics |
|---|---|---|---|---|
| 12-34-56-78-9A-BC | 123 Main St., Anytown, USA | 4 | In front of Anytown Coffee Co. | Primarily individuals aged 18-24 |
| 48-2C-6A-1E-59-3D | 123 Main St., Anytown, USA | 2 | NE corner of floor | Low income bracket individuals |
| 90-90-90-90-90-90 | 555 Broadway, Anytown, USA | 1 | Room 158 | College educated individuals |
| ... | ... | ... | ... | ... | ... |

*FIG. 4*

TRACKING BUILDING LOCATIONS OF FIXED WIRELESS DEVICES

CROSS REFERENCE TO RELATED APPLICATIONS

This application is a continuation of U.S. patent application Ser. No. 16/116,848 filed on Aug. 29, 2019, entitled TRACKING BUILDING LOCATIONS OF FIXED WIRELESS DEVICES; which is a continuation of U.S. patent application Ser. No. 15/286,456 filed on Oct. 5, 2016, entitled TRACKING BUILDING LOCATIONS OF FIXED WIRELESS DEVICES; which claims priority to U.S. Provisional Patent Application No. 62/237,512, filed on Oct. 5, 2015, entitled TRACKING BUILDING LOCATIONS OF FIXED WIRELESS DEVICES; both of which are hereby incorporated by reference in their entireties.

BACKGROUND

Consumers are increasingly replacing traditional landline telephones with mobile phones. As a result, according to the Federal Communications Commission (FCC), the majority of emergency calls made to 911 are now made from mobile phones, and many mobile phone calls are made while indoors. Thus there is a high likelihood that a call made to 911 is from an indoor wireless device.

In order to effectively respond to an emergency call, Public Safety Answering Points (PSAPs) need to be able to accurately identify the location of the emergency caller so that emergency responders may be dispatched to the caller's precise location. Yet traditional location-determination technologies used by wireless devices, such as Assisted GPS (A-GPS), are optimized for outdoor calling and often ineffective or inaccurate when used indoors. As a result there exists a gap in emergency calling location-determination accuracy between when a call is made outdoors or from a landline as compared to when the call is made from an indoor wireless device. The inability to accurately identify the location of an emergency caller can have dire consequences.

To address this gap, the FCC has called on wireless network providers to help implement a variety of measures intended to enhance the ability of PSAPs to accurately identify the location of a wireless 911 caller when the caller is indoors. One such measure is a National Emergency Address Database (NEAD), a database with dispatchable location information and identifiers, such as media access control (MAC) addresses, of fixed wireless devices (e.g., WiFi access points, Bluetooth beacons, IoT devices, etc.). When making an emergency call, an indoor wireless device would report the identifiers of the fixed wireless devices it "sees," which would be used, with reference to the NEAD, to provide indoor dispatchable location information of the wireless caller to the PSAPs.

Under its Fourth Order and Report In the Matter of Wireless E911 Location Accuracy Requirements, the FCC is requiring that the nationwide wireless network providers provide the information to populate the NEAD. There are, however, several challenges associated with acquiring the information needed for the NEAD. Thus there is a need for systems and methods that overcome these problems and provide additional benefits. Other limitations of existing or prior systems will become apparent to those of skill in the art upon reading the following Detailed Description.

BRIEF DESCRIPTION OF THE DRAWINGS

Embodiments of the disclosed technology will be described and explained through the use of the accompanying drawings.

FIG. 4 illustrates an example database containing information on fixed wireless devices.

DETAILED DESCRIPTION

Figure 1:
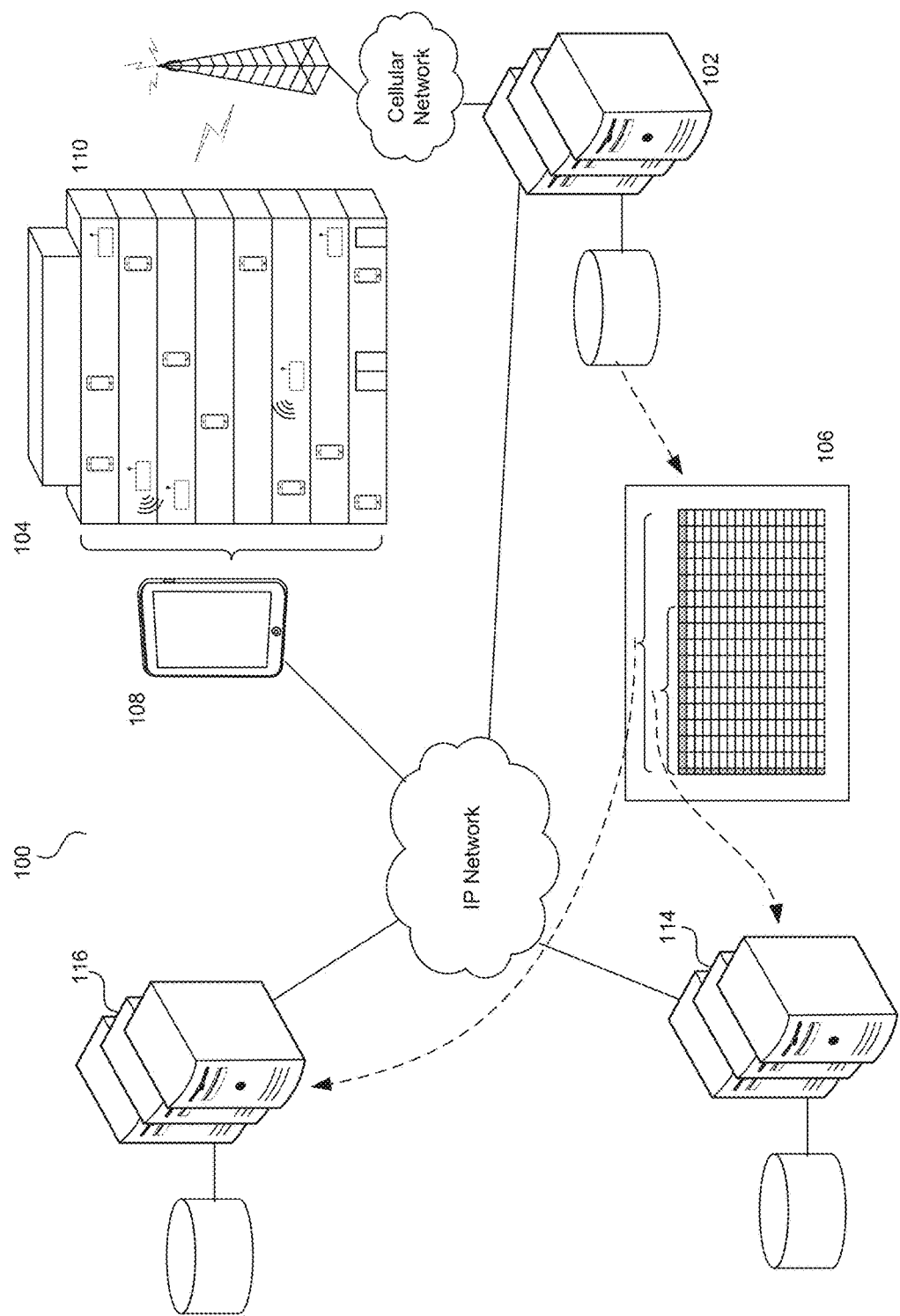
FIG. 1 illustrates a block diagram of a communications environment in which some embodiments of the disclosed technology for tracking the building location of fixed wireless devices may be utilized.

A National Emergency Address Database (NEAD), which utilizes information from each of the nationwide wireless service providers, maintains "dispatchable location" information of indoor wireless devices, i.e., a street address plus additional information such as floor and room number. The NEAD may be used to identify the indoor location of a wireless emergency caller based on the caller's proximity to the indoor wireless devices. When an emergency call is made, available dispatchable location information for an emergency wireless call may be provided from the NEAD to Public Safety Answering Points (PSAPs). In order to satisfy revised Enhanced 911 (E911) requirements set forth by the FCC, nationwide wireless services providers such as T-Mobile USA, Inc. are required to help populate the NEAD database by collecting and providing indoor location information of fixed wireless devices (e.g., WiFi access points, Bluetooth beacons, and IoT devices). In the course of collecting the FCC-mandated information required for the NEAD database, there exists the opportunity to collect additional and relevant information that may be valuable to the wireless service provider and to the wireless service provider's customers.

Accordingly, a system and method to generate a database of locations of fixed wireless devices within buildings is disclosed herein. The database may include additional information, such as non-location information of individual fixed wireless devices (e.g., the WiFi transmission type of the device, the service set identifier (SSID) of the device, the make and/or model of the device, the signal strength of the device), as well as information associated with individual buildings (e.g., the total number of fixed wireless devices in the building). The system provides for the collection of information within a building, used to prepare a report for that building. The system also provides for the generation of the database based on the prepared building reports. As described in greater detail herein, different portions of the database may be made available to different users, such as some fields for emergency responders and some fields for businesses. Though described as a single database in which different portions of the database are available to different users, the system may also generate and maintain distinct databases for each of the described database portions.

To prepare a building report, a reports-provider utilizes a mobile reporting device to collect information from a building. The reports-provider may be anyone with a relationship with the entity operating the system. For example, the reports-provider may be an employee of the entity or a contractor of the entity. As a further example, the reports-provider may be a building inspector or compliance evaluator who has agreed to provide information to the system. In particular, the reports-provider may be an inspector of building fire safety systems (e.g., sprinklers), and may collect information for the system in the course of performing their normal fire safety inspection of a building. As an additional example, the building-reports provider may be a customer of the entity operating the system, and the system may utilize crowdsourced data from a plurality of customers. The mobile reporting device may be any mobile computing device with wireless networking capabilities, such as a laptop, netbook, tablet, or mobile phone. The mobile reporting device may be capable of communicating with wireless data networks, such as WiFi, Bluetooth, NFC, etc. The mobile reporting device may also be capable of communication with mobile phone networks. The mobile reporting device may also run a reporting application provided by the system, which facilitates the collection of building information.

To collect building information, the reports-provider walks throughout the building with the mobile reporting device. As described above, the reports-provider may be a building inspector, and may need to walk through the interior of the building in the course of inspecting the building. As the reports-provider walks throughout the building, the mobile reporting device or reporting application "sniffs" for and identifies fixed wireless devices within the building. Examples of fixed wireless devices include WiFi access point, Bluetooth beacons, WiFi-enabled appliances, WiFi-enabled fixtures, and other wireless-enabled devices that are fixed to a single location within a building or are otherwise static.

Using the mobile reporting device, the reports-provider is directed to each of the identified fixed wireless devices. For example, the mobile reporting device may use the signal strength from fixed wireless devices to determine the report-provider's proximity to the fixed wireless devices, and may provide directional feedback to each of the identified fixed wireless devices. That is, the mobile reporting device may indicate that the next fixed wireless device to be recorded is located a certain distance away in a particular direction, and instruct the reports-provider to move towards that fixed wireless device.

Once the reports-provider is satisfied that she has the located the fixed wireless device to which she was directed, the reports-provider may enter location information for the fixed wireless device into the mobile reporting device. As described herein, certain aspects of location information may be entered manually by the report-provider (for example, the reports-provider may indicate her current floor or room location, or may select her current location on a building floorplan displayed by the mobile reporting device), and certain aspects of location information may be determined by the mobile reporting device (for example, using barometric sensors, compass sensors, laser rangefinders, and dead reckoning).

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Environments

FIG. 1 and the following discussion provide a brief, general description of a suitable environment in which a system to detect logo images may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the figures, FIG. 1 is a block diagram illustrating a representative environment 100 in which a fixed wireless device building location tracking system 102 may operate. The system 102 provides for the collection of information within a building 104 used to prepare a report for that building. The system 102 also provides for the generation of database 106 based on the prepared building reports associated with different buildings.

To generate a building report, a reports-provider walks through the building 104 with a mobile reporting device 108. While walking through the building 104, the mobile reporting device 108 detects fixed wireless devices (e.g., wireless access points, Bluetooth beacons, etc.) 110. As described below, the mobile reporting device 108 generates a report that includes, for example, information on the locations within the building of the fixed wireless devices 110.

Based on building reports generated for different buildings 104 and received from mobile reporting devices 108, the system 102 builds the database 106. The database 106 includes, for example, information on the identity and location of the fixed wireless devices 110 found within buildings 104. However, as described below, the database 106 may include other information.

As illustrated in FIG. 1, the database 106 generated and maintained by the system 102 may be shared with users 114 and 116. Furthermore, as illustrated, different users may receive different portions (e.g., different entries or different fields for each entry) of the database 106. For example, user 114 may be an emergency responder and have access only to information needed to locate an emergency caller, while user 116 may be a commercial user with access to information regarding the type of wireless devices identified in the building and/or demographic information of users identified in the building. Though illustrated as a single database 106, the system may maintain different databases, each containing different portions, and each provided to different users.

Flows for a Wireless Device Building Location Tracking System

Figure 2:
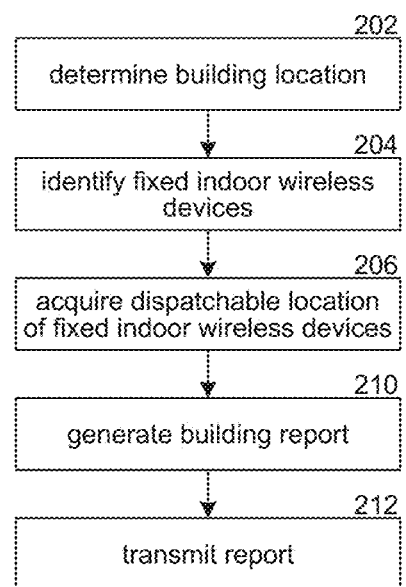
FIG. 2 is a flowchart illustrating an example of a set of operations for collecting information on fixed wireless devices found within a building.

FIG. 2 is a flowchart illustrating an example process 200, implemented by the mobile reporting device 108 and/or the system 102, for generating a building report.

At a block 202, a mobile reporting device in use by a reports-provider determines the location of a building for which a building report is to be generated. The mobile reporting device may use any location-determination technique, such as A-GPS or other techniques optimized for outdoor locations. Alternatively, the reports provider may enter such information manually.

At a block 204, the mobile reporting device identifies fixed wireless devices found inside the building. For example, the mobile reporting device may use signal strength from devices, such as over WiFi or Bluetooth, to detect in-range wireless devices. The mobile reporting device may also identify a unique identifier associated with each fixed wireless device, such as device's media access control (MAC) address.

At a block 206, the mobile reporting device acquires a dispatchable location for each fixed wireless device. When the reports-provider is within a certain proximity of a fixed wireless device, the mobile reporting device may prompt the reports-provider to enter certain location information regarding the fixed wireless device into the mobile reporting device. For example, in a multi-story building, the reports-provider may be asked to provide the floor of the building where the fixed wireless device is located. The results-provider may be asked to provide information regarding where on that floor the fixed wireless device is located. For example, the results-provider may indicate that the fixed wireless device is located in the northwest corner or near the southern edge of the building. The results-provider may indicate a room number or storefront in which the fixed wireless device is located. The results-provider may indicate whether the fixed wireless device is located near any prominent and static landmarks or features of the building (e.g., near a statue, a water feature, an elevator bank, etc.). As a further example, the mobile reporting device may display an interior floorplan of the building, and the reports-provider may enter the fixed wireless device location information by selecting her current location on the displayed floorplan. Alternatively or in addition to interior building floorplans, the mobile reporting device may display other types of building schematics that reference features, such as fire sprinkler grids, based on which the reports-provider may indicate the fixed wireless device location. Such intra-floor location information may take any form that would be helpful to an emergency responder attempting to locate the fixed wireless device upon entering the building. The reports-provider may also confirm that the device she was directed to is a fixed wireless device, e.g., a fixed wireless access point.

The mobile reporting device may automatically supplement or verify the location information for a fixed wireless device provided by the reports-provider. For example, using a barometer or other sensor, the mobile reporting device may determine the elevation of the mobile reporting device, which may be used to determine the floor on which the fixed wireless device is located. Using a compass or other sensor, the mobile reporting device may be able to determine towards which direction the fixed wireless device is located. Additional information may be obtained automatically, e.g. through the use of a camera and image recognition software, etc.

The mobile reporting device may also automatically generate fixed wireless device location information using, for example, dead reckoning techniques. For example, the mobile reporting device may acquire GPS-based location information for an entrance into the building. The entrance location information may have been determined, for example, at block 202. The known entrance location information may then be combined with data characterizing the reports-provider's movement from the entrance and within the building to generate, for example, coordinates corresponding to her internal location. The data characterizing the reports-provider's movement through the building may be based on sensors of the mobile reporting device, such as accelerometers, compasses, barometers, etc. When the reports-provider indicates that she is at a fixed wireless device, the generated coordinates corresponding to her present location may be used as the location of the fixed wireless device. In addition, the coordinates may be translated by the system into a location form better understood by emergency responders (e.g., floor and room number) based on a building floorplan, mapped to coordinates, available to the system.

Once the mobile reporting device has sufficient location information for a fixed wireless device, based on information provided by the reports-provider or information determined by the mobile reporting device, the mobile reporting device combines the location information with other information to form a report entry for the fixed wireless device. For example, as described above, the mobile reporting device may identify a unique identifier of the fixed wireless device, such as the device's MAC address. The mobile reporting device may also capture other characteristics of the fixed wireless device, such as the SSID used by the fixed wireless device, the type of wireless transmission used by the fixed wireless device (e.g., 802.11(b), 802.11(c), 802.11 (g), 802.11(n), etc.), the channel used by the fixed wireless device, the signal strength of the fixed wireless device, and the make and model of the fixed wireless device. Certain fixed wireless device characteristics may be captured automatically by the mobile reporting device based on communication between the two devices. Other fixed wireless device characteristics may be entered manually by the reports-provider. Still other fixed wireless device characteristics may be captured based on scanning a barcode or other tag on the fixed wireless device. The mobile reporting device may detect the number and identifiers of other wireless devices in-range of the fixed wireless device. The mobile reporting device may capture any information from the fixed wireless device that is readable, and this captured information may be included in the report entry.

Returning to FIG. 2, at a block 210, the mobile reporting device generates a report for the building. Once all fixed wireless devices in a building are accounted for, the mobile reporting device prepares a report for that building. For example, the mobile reporting device may determine that report entries have been recorded for each of the fixed wireless devices detected during the reports-provider's walk throughout the building. The report entries for all of the fixed wireless devices within the building are then combined with location information for the building to generate a building report. The building location information may, for example, be in the form of the street address of the building. As described above, the building location information may have been entered by the reports-provider, or may have been determined by the mobile reporting device using, for example, A-GPS or other location-determination techniques optimized for determining an outdoor location. At a block 212, the report for the building is then transmitted to a server associated with the system.

Figure 3:
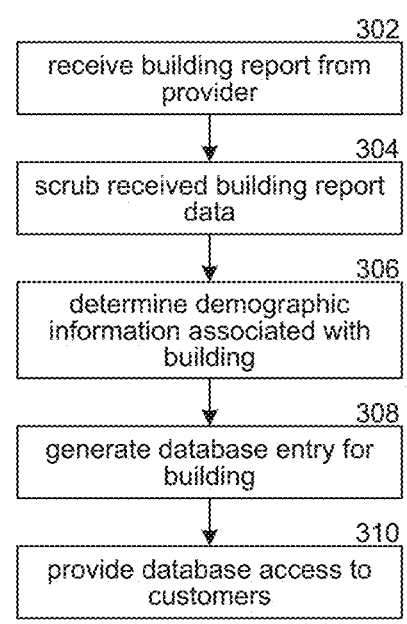
FIG. 3 is a flowchart illustrating an example of a set of operations for generating a database of fixed wireless devices based on received building reports.

FIG. 3 is a flowchart illustrating an example process 300, implemented by the system 102, for generating database entries for fixed wireless devices found in a building report, and providing the information to customers.

At a block 302, the system receives a building report from a reports-provider and mobile reporting device. The building report may have been generated as described by example process 200. The received building report is used by the system to generate, update, or verify the database maintained by the system.

At a block 304, the system processes the received building report for use in generating the database. For example, building reports received by the system from different reports-providers and different mobile reporting devices may be in different formats. Accordingly, the building report may need to be formatted into a standard format used by the system. The building report may also have extraneous information from the building report removed.

At a block 306, the system determines demographic information associated with the building. This demographic information may be saved in the database entries associated with the building. Demographic information may, for example, be provided by a wireless network provider, survey data, or other source. Furthermore, the demographic information may only be saved in aggregate. For example, the database entry for a fixed wireless device may contain the historical number of nearby individuals within different age ranges, income brackets, or genders, and include no individually identifying information. For example, based on multiple building reports or multiple readings from a single building report, the database may reflect that on average there are a certain number of individuals of age range 18-24 within range of a particular fixed wireless device.

At a block 308, the processed building report is used in combination with the determined demographic information to generate database entries for the fixed wireless devices associated with the building. For example, if a building report is the first report received for a building, the report data may be used to generate database entries for each of the fixed wireless devices recorded in the report. If the database already contains entries corresponding to the building, the received building report may be used to update database entries for fixed wireless devices located within that building. For example, a fixed wireless device previously recorded in a building report and reflected in a database entry may have been moved or taken offline. As a result, the report entry corresponding to the fixed wireless device may reflect a different location (if it was moved), or no entry may be found (if it was taken offline). The database maintained by the system may then be updated to reflect the revised status of the fixed wireless device. In addition to a unique identifier and location information, each database entry for a fixed wireless device may also include other information reflected in the building report, such as the nearness to other wireless devices and any information captured from the fixed wireless device, as described above.

At a block 310, entries in the updated database are made available to users of the system. As described above, information in the database may be accessed and utilized by various entities for different purposes. Furthermore, certain information in the database may be accessible to some entities but not others. For example, with reference to FIG. 4, certain database information, such as fixed wireless device identifiers and location information, may be supplied to populate the NEAD database. However, the system may be configured to provide no additional information, such as demographic information, for NEAD purposes. In a further example, with reference still to FIG. 4, a third-party customer may be provided other information from the database. For example, a customer wishing to construct a targeted advertising campaign based on what segments of users are found near certain stores (such as in a mall) may receive aggregate demographic information for the population found within range of fixed wireless devices within the mall, but may receive less precise location information for the fixed wireless devices.

Example User Displays

FIGS. 5, 6, 7, and 8 illustrate example graphical user interfaces 500, 600, 700, and 800, such as may be generated by a mobile reporting device used for collecting information regarding fixed wireless devices within a building (for example, during an inspection of the building). The depicted interfaces are merely representative of the types of interfaces that may be generated by the system. One skilled in the art will appreciate that various changes can be made to the interfaces in accordance with common design practices. For example, various elements can be added or omitted from the depicted interfaces.

Figure 5:
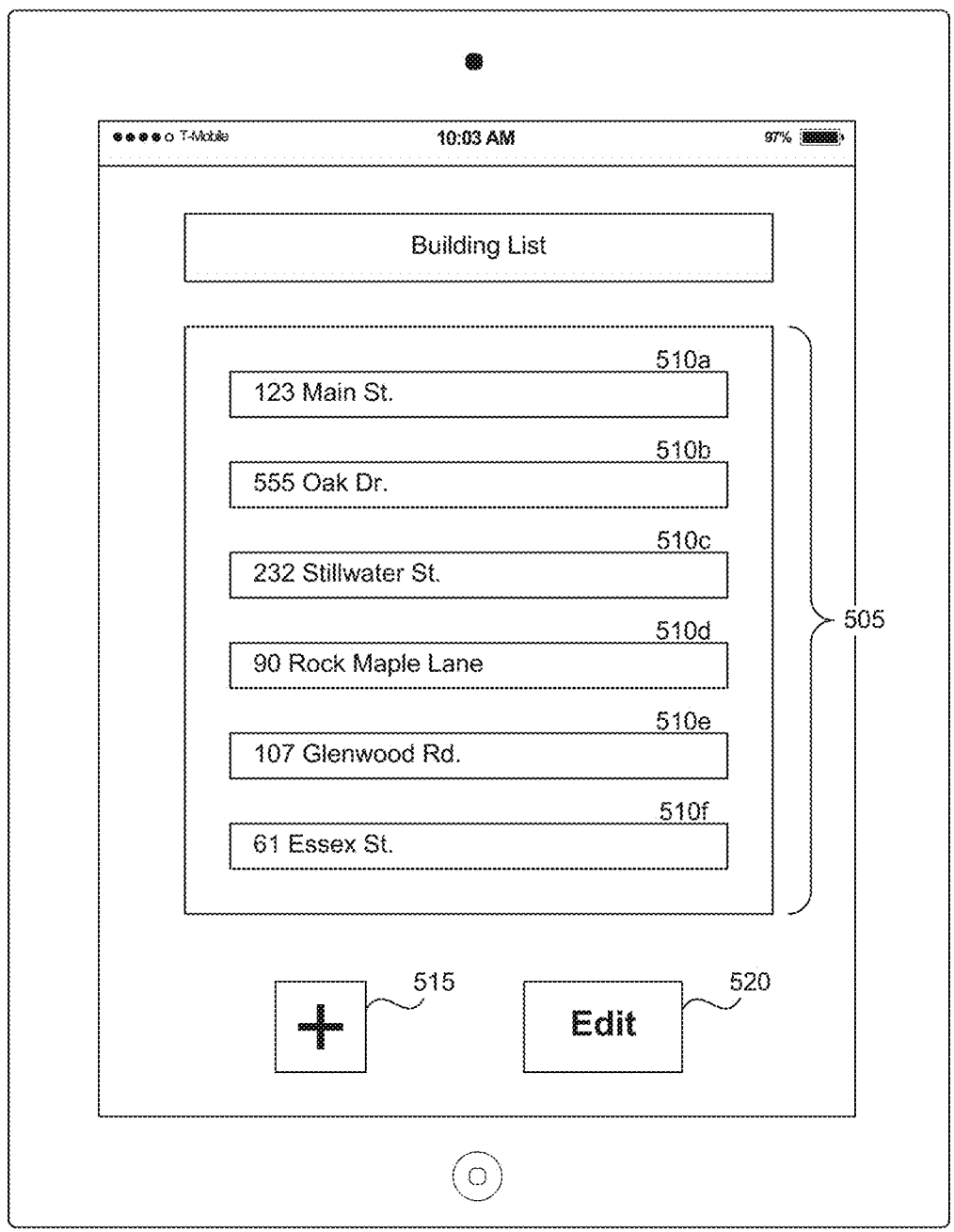
FIG. 5 is an example graphical user interface for selecting a building for which location information of contained fixed wireless devices is to be provided.

Referring to FIG. 5, a graphical user interface 500 displays a building list 505. The building lists 505 contains a list of individual buildings 510a, 510b, etc. Though FIG. 5 illustrates each of the individual buildings 510 as being identified by their street address, individual buildings may also be identified by the coordinates corresponding to the building or any other identifier. In some embodiments, the building lists 505 only lists buildings close in proximity (for example, based on GPS data) to the mobile reporting device.

In some embodiments, the interface 500 may include a top-down map view of nearby buildings instead of or in addition to the building list 505 (e.g. by accessing with APIs third party mapping applications like Google maps). The interface 500 includes an "add" interface element 515, which allows a user to add an entry for a building not listed. The interface 500 also includes an "edit" interface element 520, which allows a user to modify information regarding the building (such as the building address, building coordinates, etc.). The selection of an individual building 510, either through the building list 505 or a top-down map view (not shown), enables a user to enter information regarding fixed wireless devices within the building, and can cause the mobile reporting device to display a next screen similar to that shown in FIG. 6.

Figure 6:
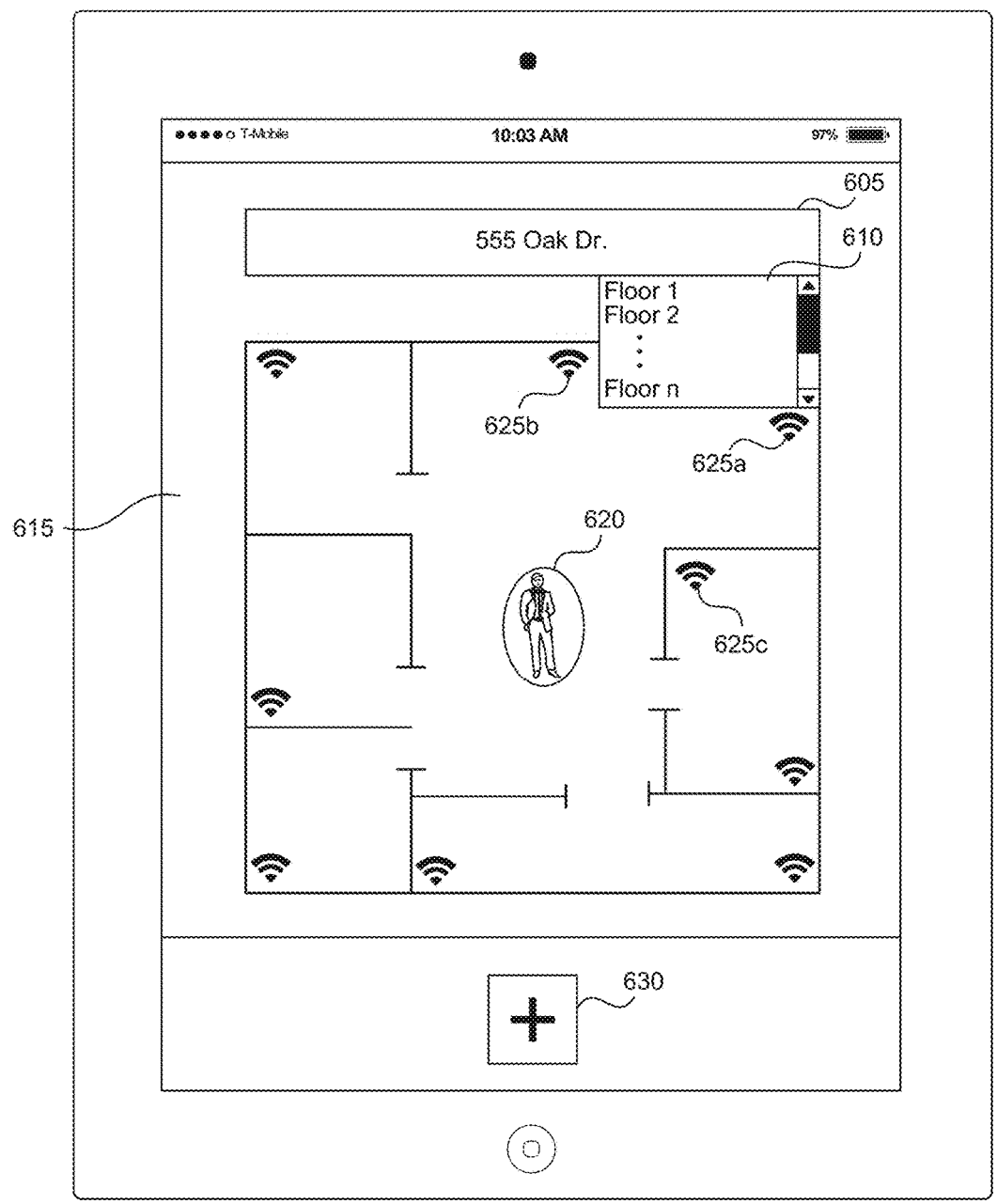
FIG. 6 is an example graphical user interface for viewing a building floorplan and selecting a fixed wireless device.

Referring to FIG. 6, a graphical user interface 600 displays a building floorplan 615 for an individual building. The floorplan 615 illustrates the interior layout and features of the building, and may, for example, be based on an interior building schematic used for a building safety inspection (e.g., fire sprinkler inspection). In a multi-story building, the displayed building floorplan 615 may be based on a user-selected floor in a floor drop-down menu 610. A location display 605 provides information regarding the currently displayed layout or floorplan, such as the building's street address, which floor within that building, and a location on that floor (e.g. northwest corner). The displayed building floorplan 615 may additionally be based on information indicative of which floor the mobile reporting device is currently on, such as barometric measurements received by the mobile reporting device.

The displayed building floorplan 615 may render an indication of the detected location 620 of the mobile reporting device and/or user of the mobile reporting device. The detected location 620 may be based on, for example, dead reckoning calculations performed by the mobile reporting device based on sensor data (e.g., accelerometer data) received by the mobile reporting device. The displayed building floorplan 615 also depicts locations of fixed wireless devices 625a, 625b, 625c, etc. The depicted fixed wireless devices 625 may represent fixed wireless devices for which location and other information has been entered by a user, as described below. The depicted fixed wireless devices 625 may represent fixed wireless devices detected by the mobile reporting device, but for which no user-provided information has been entered. Though not shown, the interface 600 may depict the fixed wireless devices differently depending on whether user-provided information has been entered for that fixed wireless device. The interface 600 also includes an "add" interface element 630, which allows a user to add a fixed wireless device 625 not detected by the mobile reporting device. The selection of a fixed wireless device 625 on the building floorplan 615 enables a user to view additional information regarding the selected fixed wireless device. For example, if the mobile reporting device has a touch-sensitive display, the user can simply select a depicted fixed wireless device by tapping on it, which can cause the mobile reporting device to display a next screen, such as that shown in FIG. 7.

Figure 7:
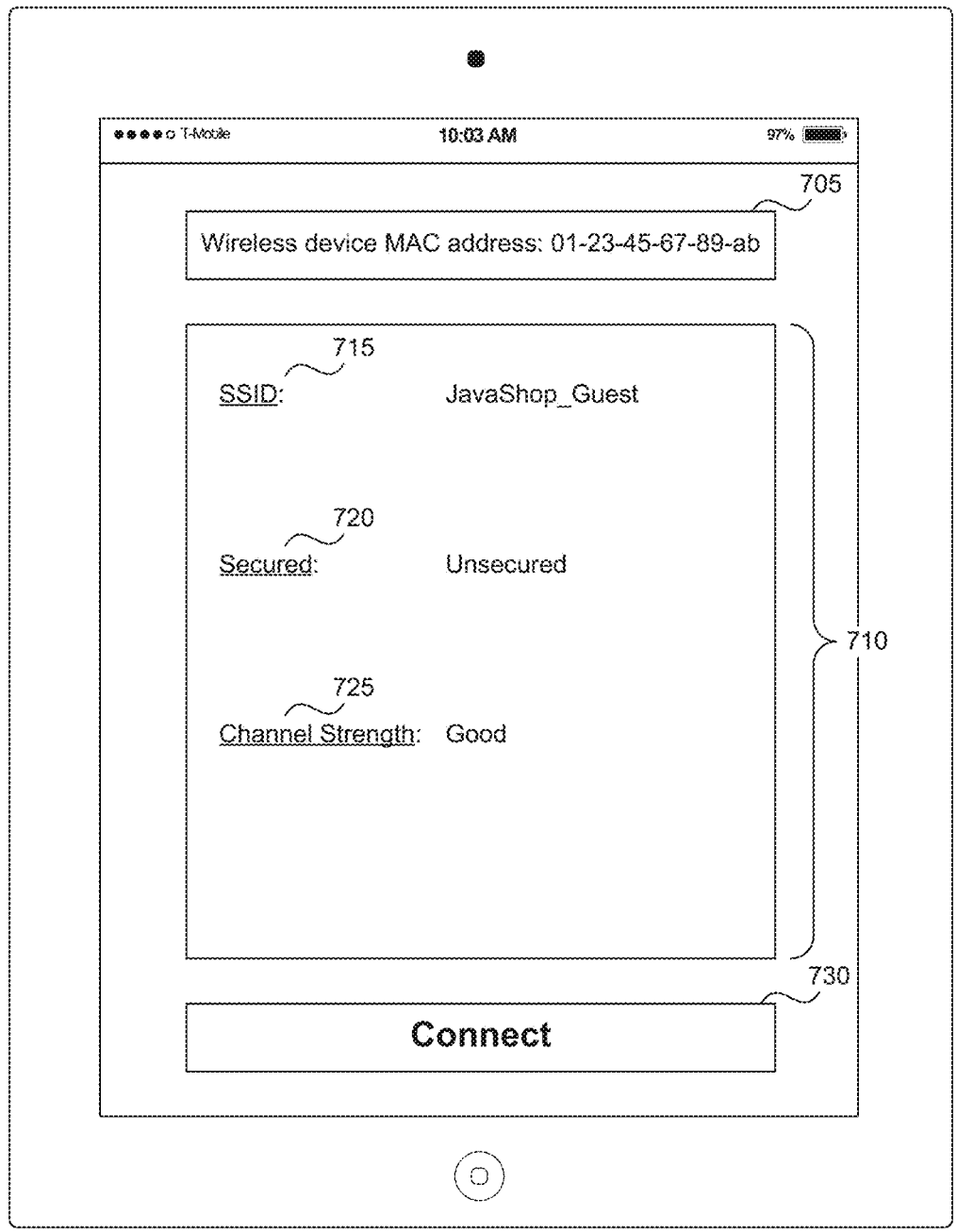
FIG. 7 is an example graphical user interface for viewing data associated with a selected fixed wireless device.

Referring to FIG. 7, a graphical user interface 700 displays identified information 710 regarding the fixed wireless device 705. The fixed wireless device 705 may for example be identified by its MAC address or other unique identifier. The identified information 710 contains information that may be obtained or discerned based on communication with the fixed wireless device. For example, identified information 710 may include the SSID 715 of the fixed wireless device's wireless network. As an additional example, identified information 710 may include a security indication 720, which indicates whether or not the network of the fixed wireless device is secure. As a further example, the identified information 710 may include an indication of the signal strength 725 of the fixed wireless device. Though not shown, it will be appreciated that other types of information may be included in the identified information 710, such as the channel number on which the fixed wireless device is communication and the wireless type of the fixed wireless device (e.g., Bluetooth, 802.11(b), 802.11(c), 802.11(g), 802.11(n)). The interface 700 also include a "connect" interface element 730, which enables the user to connect to the fixed wireless device and obtain other device information, and may bring up a data entry screen, such as that shown in FIG. 8.

Figure 8:
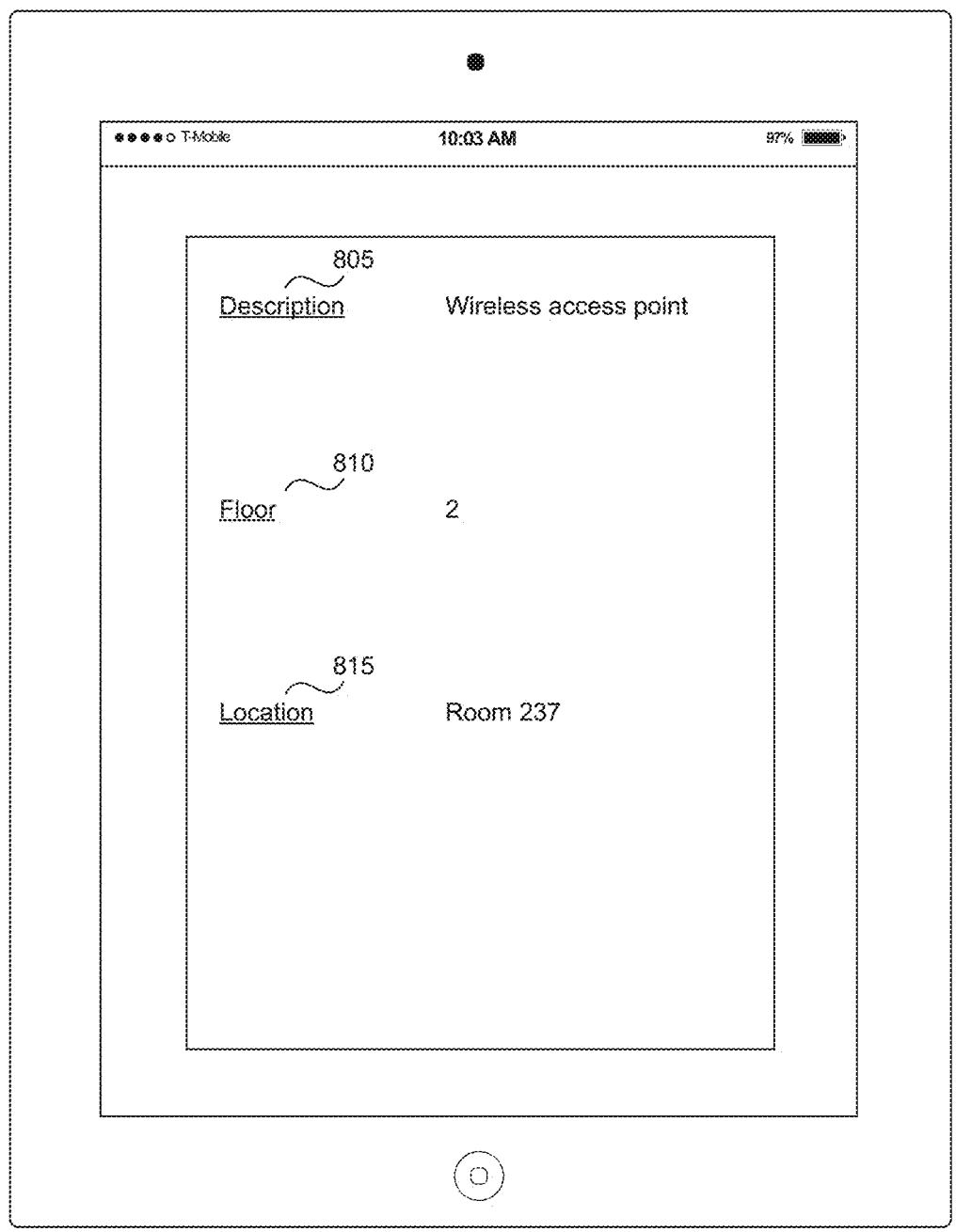
FIG. 8 is an example graphical user interface for entering location and other information regarding a selected fixed wireless device.

Referring to FIG. 8, a graphical user interface 800 is used by a user for reviewing and entering/editing location and other information for a selected fixed wireless device. For example, a user may enter descriptive information 805, such as the make and model of the fixed wireless device, specific location on a floor of the fixed wireless device, whether the fixed wireless device is a wireless access point or a Bluetooth beacon (if that information was not automatically collected), etc. For example, the user may enter the floor 810 on which the fixed wireless device is located within the building. The floor information may be manually entered by the user, or the system may provide an estimated floor number (based, for example, on barometer information or dead reckoning) that is verified or corrected by the user. The user may also enter location information 815 for the fixed wireless device. As described, the location information 815 may describe the room number in which the device is located, which corner of the building the device is nearest, whether there are any identifiable landmarks or features of the building interior (e.g., a sculpture or water feature) near to the fixed wireless device, etc. Location information 815 may be manually entered by the user, e.g. when the user selects a particular field displayed by the interface 800, the mobile reporting device may display a touch sensitive keyboard if no keyboard is currently provided to the user. In addition to or alternatively, the system may provide an estimated floor location (e.g., coordinates within the floor) based on determinations made by the mobile reporting device (e.g., dead reckoning using an accelerometer), which may be verified or corrected by the user.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A computer-implemented method for locating stationary wireless devices within a building, the method comprising:
    identifying a street address of a building based on a building list that includes location identifiers of multiple buildings geographically proximate to a computing system,
        wherein the computing system is a portable computing system having—
            at least one processor, and
            at least one wireless communication circuit coupled to the processor;
    generating indoor location information including a determined floor for the fixed stationary wireless device within the building by:
        automatically obtaining, via the computing system, a location-related signal, and
        automatically estimating, via the computing system, the determined floor according to received GPS location information, the location-related signal, or a combination thereof; and
    providing a location for the stationary wireless device found within the building based on the street address of the building and the generated indoor location information of the stationary wireless device.

2. The method of claim 1, further comprising providing the location of the stationary wireless device in the building to an emergency responder in response to an emergency call made from within the building.

3. The method of claim 1, further comprising generating a listing of one or more stationary wireless devices within the building, wherein the listing includes a wireless transmission type, a service set identifier (SSID), a make, a model, or a signal strength of stationary wireless devices.

4. The method of claim 1, wherein the building floor on which the stationary wireless device is located is determined based on a barometer measurement acquired via the computing system.

5. The method of claim 1, wherein the location of one of the stationary wireless devices is provided based on a compass reading acquired via the computing system.

6. The method of claim 1, further comprising:
    displaying, on the computing system, a floorplan of the building;
    via the computing system, receiving user input selecting a location on the displayed floorplan; and
    providing the location of the stationary wireless device based on the received user input.

7. The method of claim 1, wherein generating the indoor location information for the stationary wireless device includes:
    acquiring geographic coordinates for a location of the building;
    monitoring movement of the computing system with respect to the building location, wherein the monitoring is based on accelerometer data received by the computing system, barometer measurements received by the computing system, or compass readings received by the computing system;
    receiving an indication that the computing system is located at the stationary wireless device; and
    automatically determining the location of the stationary wireless device based on building location coordinates and the monitored movements from the building location.

8. At least one data processing system programmed to identify stationary wireless devices within a building, the system comprising:
    at least one hardware processor;
    at least one memory device, coupled to the processor, and storing instructions which when executed by the processor perform a method, the instructions comprising:
        instructions to identify a street address of a building based on a building list that includes location identifiers of multiple buildings geographically proximate to a computing system,
        instructions to generate indoor location information including a determined floor for the fixed stationary wireless device within the building by:
            automatically obtaining, via the computing system, a location-related signal, and automatically estimating, via the computing system, the determined floor according to received GPS location information, the location-related signal, or a combination thereof; and instructions to provide a location for the stationary wireless device found within the building based on the street address of the building and the generated indoor location information of the stationary wireless device.

9. The system of claim 8, wherein the memory device further includes instructions to provide the location of a stationary wireless device in the building to an emergency responder in response to an emergency call made from within the building.

10. The system of claim 8, wherein the memory device further includes instructions to generate a listing of one or more stationary wireless devices within the building, wherein the listing includes a wireless transmission type, a service set identifier (SSID), a make, a model, or a signal strength of stationary wireless devices.

11. The system of claim 8, wherein the building floor on which the stationary wireless device is located is determined based on a barometer measurement acquired via the computing system.

12. The system of claim 8, wherein the location of one of the stationary wireless devices is provided based on a compass reading acquired via the computing system.

13. The system of claim 8, wherein the memory device further includes instructions to:
  display a floorplan of the building;
  acquire user input selecting a location on the displayed floorplan; and
  provide the location of the stationary wireless device based on the received user input.

14. The system of claim 8, wherein the instructions to generate the indoor location information for the fixed stationary wireless device includes:
  instructions to acquire geographic coordinates for a location of the building;
  instructions to monitor movement of the computing system with respect to the building location, wherein the monitoring is based on accelerometer data received by the computing system, barometer measurements received by the computing system, or compass readings received by the computing system;
  instructions to receive an indication that the computing system is located at the stationary wireless device; and
  instructions to automatically determine the location of the stationary wireless device based on building location coordinates and the monitored movements from the building location.

15. At least one non-transitory computer-readable medium comprising instructions configured to cause one or more processors to perform a method for identifying stationary wireless devices within a building, the method comprising:
  generating indoor location information for a stationary wireless device within the building by:
    automatically obtaining a location-related signal via a computing system,
    wherein the computing system includes—
      at least one hardware processor;
      at least one wireless communication circuit coupled to the processor;
      at least one display component coupled to the processor;
      at least one data input component coupled to the processor;
    at least one data entry component coupled to the processor;
    determining a floor of the building on which the stationary wireless device is located;
      wherein the determined floor is automatically estimated according to one or more signals received by the computing system; and,
  providing a location for the stationary wireless device found within the building based on a street address of the building and the generated indoor location information of the stationary wireless device.

16. The at least one non-transitory computer-readable medium of claim 15, wherein the method further comprises providing the location of the stationary wireless device in the building to an emergency responder in response to an emergency call made from within the building.

17. The at least one non-transitory computer-readable medium of claim 15, wherein the method further comprises generating a listing of one or more stationary wireless devices within the building, wherein the listing includes a wireless transmission type, a service set identifier (SSID), a make, a model, or a signal strength of stationary wireless devices.

18. The at least one non-transitory computer-readable medium of claim 15, wherein the building floor on which the stationary wireless device is located is determined based on a barometer measurement received from a data input circuit.

19. The at least one non-transitory computer-readable medium of claim 15, wherein the location of the stationary wireless device is provided based on a compass reading received by a data input circuit.

20. The at least one non-transitory computer-readable medium of claim 15, wherein the method further comprises:
  displaying, on the computing system, a floorplan of the building;
  via the computing system, receiving user input selecting a location on the displayed floorplan; and
  providing the location of the stationary wireless device based on the received user input.

* * * * *